United States Patent [19]
Czerniejewski

[11] 3,914,794
[45] Oct. 21, 1975

[54] TRAINING SIMULATOR FOR NUCLEAR POWER PLANT REACTOR CONTROL MODEL AND METHOD

[75] Inventor: Francis R. Czerniejewski, Glenshaw, Pa.

[73] Assignee: Westinghouse Electric Corporation, Pittsburgh, Pa.

[22] Filed: Feb. 23, 1973

[21] Appl. No.: 335,288

[52] U.S. Cl. .......................... 444/1; 35/13; 176/19
[51] Int. Cl. ..... G06f 15/06; G06f 15/56; G09b 9/00
[58] Field of Search ........... 444/1; 235/184; 176/19, 176/24; 35/10, 13, 10.2

[56] References Cited
UNITED STATES PATENTS
3,061,945  1/1962  Hawkins .................................. 35/10
3,237,318  3/1966  Schager ................................... 35/10

OTHER PUBLICATIONS
Reactor Simulator Tuilizing a Vacuum; Harry Reese, Jr.; RCA Technical Notes, RCA TN No.: 493, Sept. 1961.
Dynamic Simulation of a East Reactor; R. G. Olson, Nucleonics, May, 1957; pp. 76–79.
An Electronic Reactor Simulator; Ross Cameron & D. A. Austio; Nuclear Power; April, 1957; pp. 146–151.
PWR Training Simulator; J. P. Franz & W. H. Alliston; Nucleonics, May, 1957; pp. 80–83.

Primary Examiner—Malcolm A. Morrison
Assistant Examiner—Edward J. Wise
Attorney, Agent, or Firm—H. W. Patterson

[57] ABSTRACT

A method and system for the real-time dynamic simulation of a nuclear power plant for training purposes, wherein a control console has a plurality of manual and automatic remote control devices for operating simulated control rods and has indicating devices for monitoring the physical operation of a simulated reactor. Digital computer means are connected to the control console to calculate data values for operating the monitoring devices in accordance with the control devices. The simulation of the reactor control rod mechanism is disclosed whereby the digital computer means operates the rod position monitoring devices in a real-time that is a fraction of the computer time steps; and simulates the quick response of a control rod remote control lever together with the delayed response upon a change of direction.

18 Claims, 27 Drawing Figures

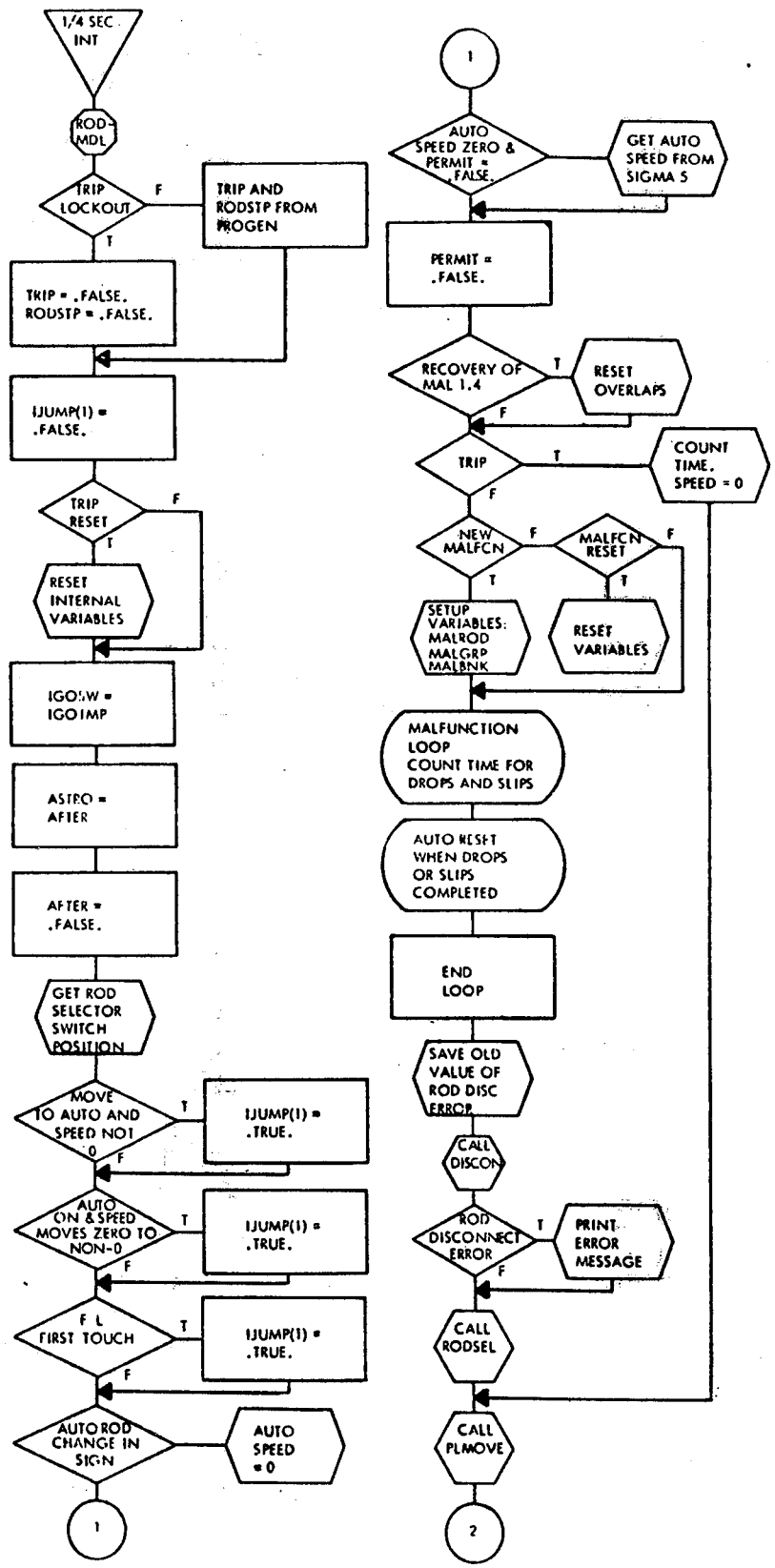
FIG. 96/31A

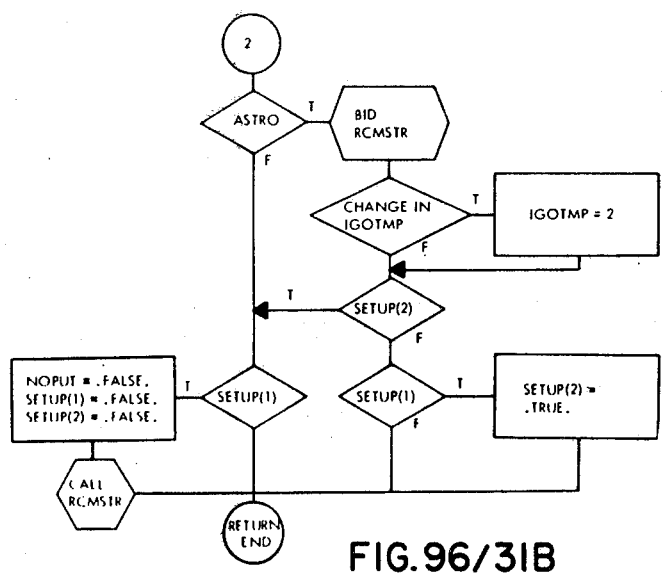
FIG.96/31B
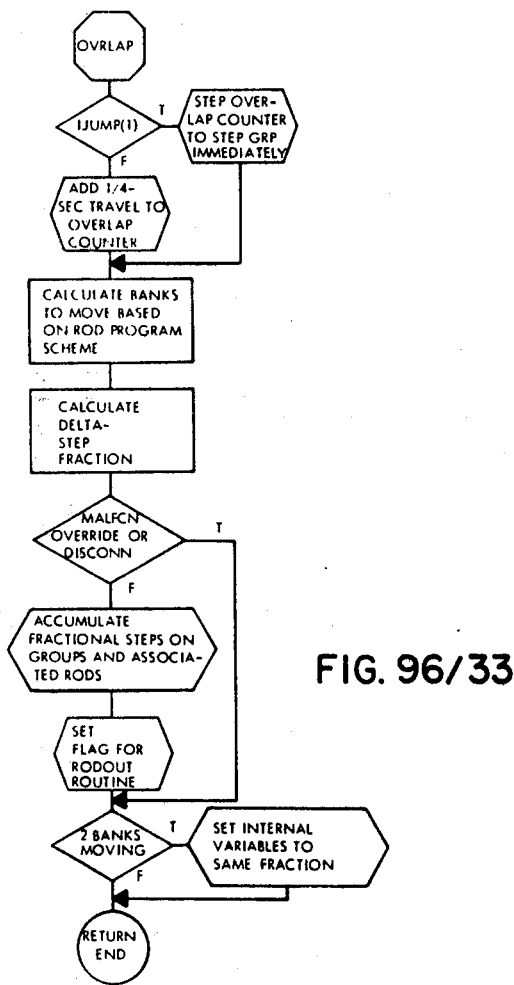
FIG. 96/33

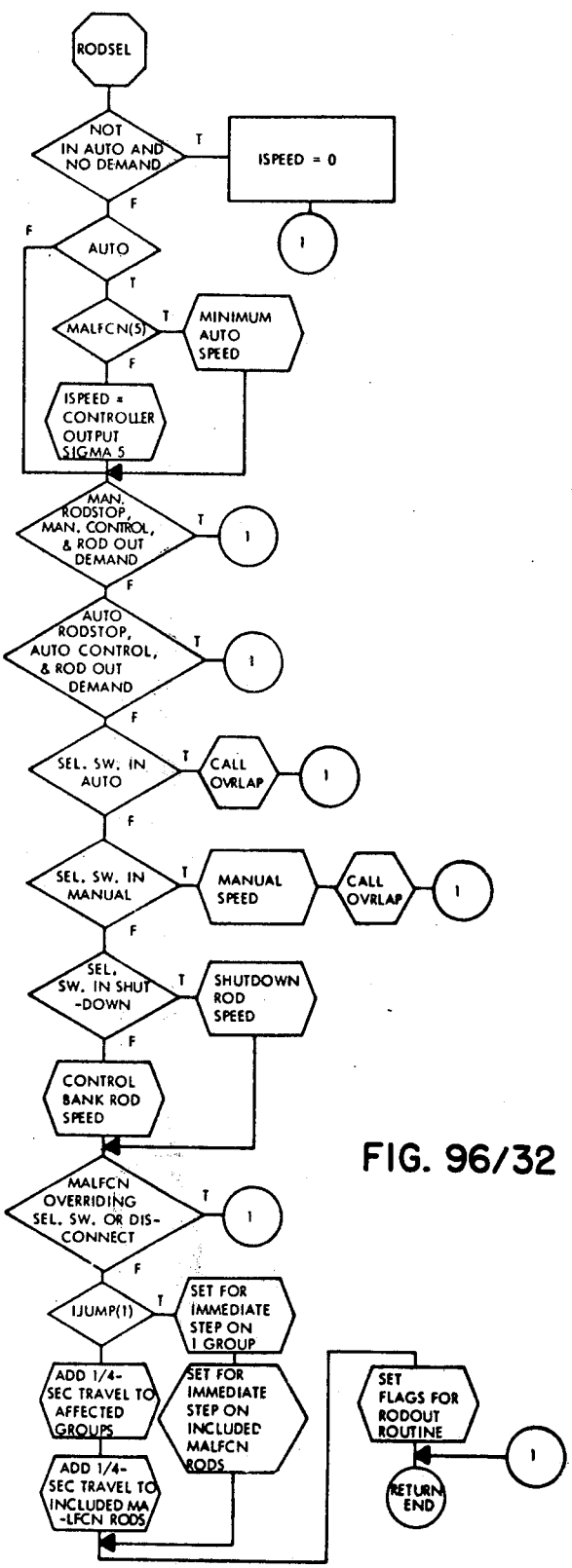
FIG. 96/32

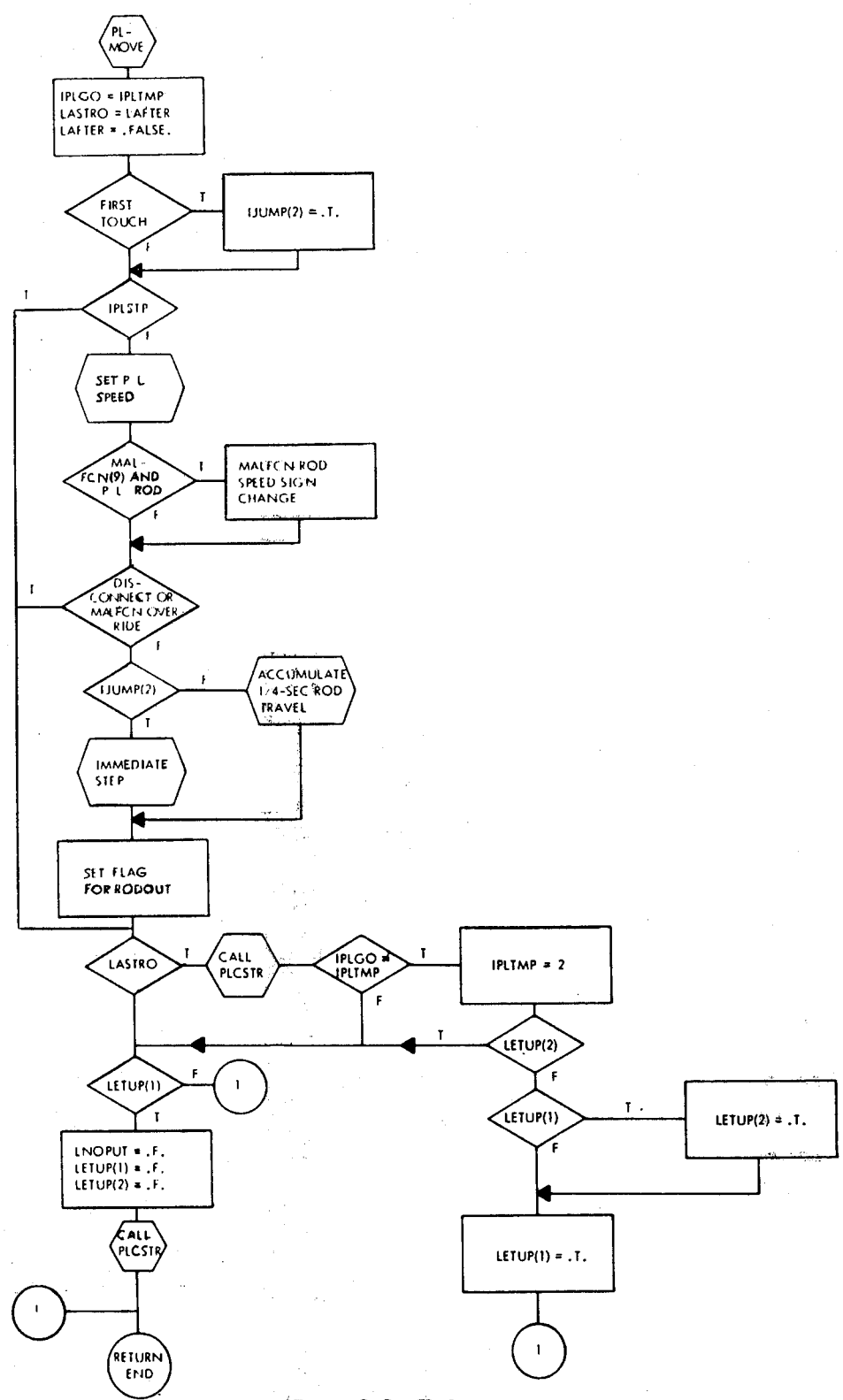
FIG. 96/34

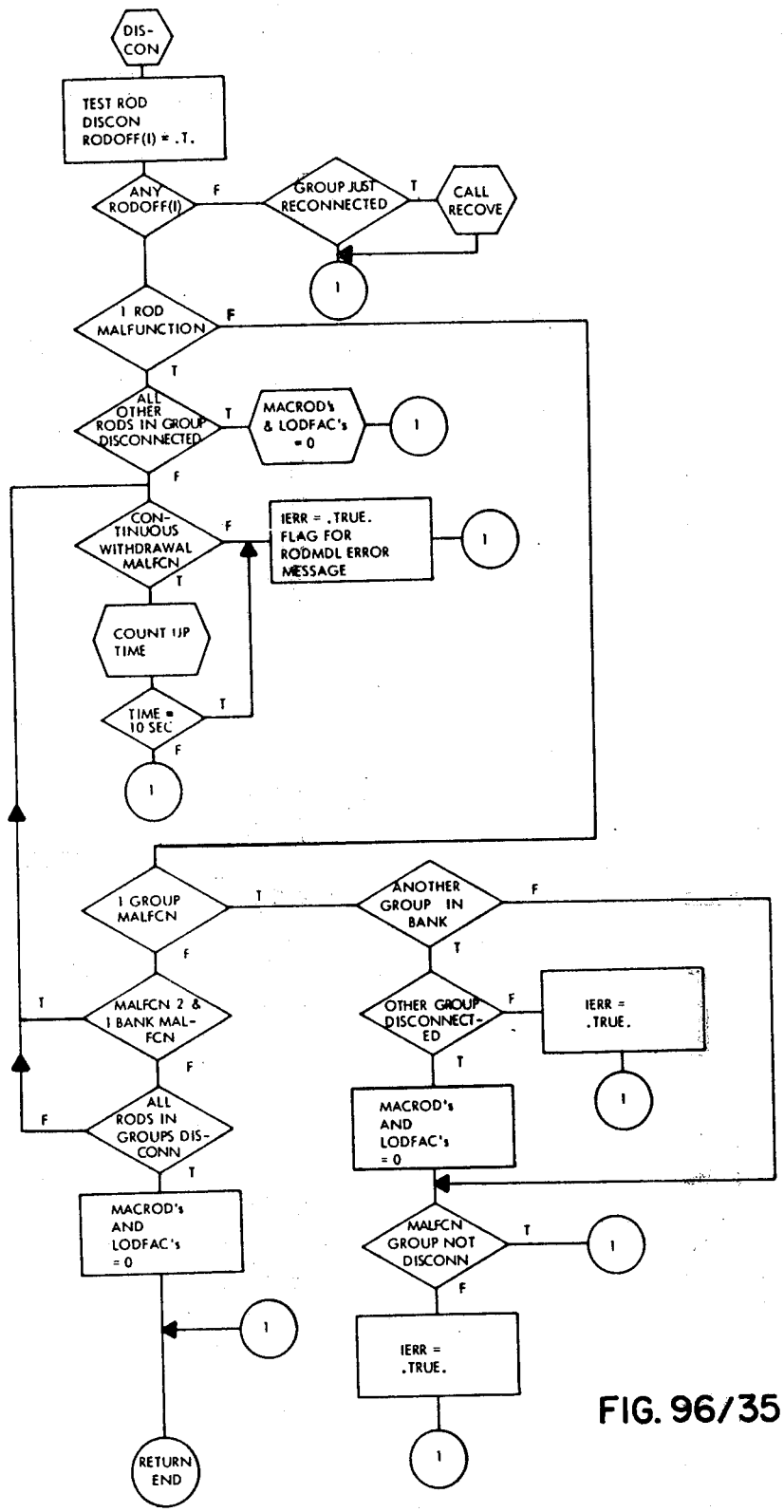
FIG. 96/35

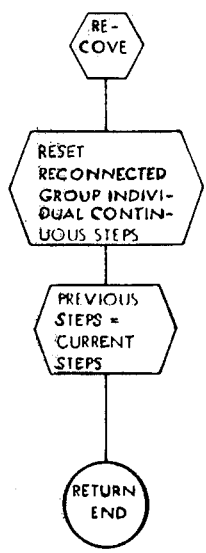
FIG. 96/36
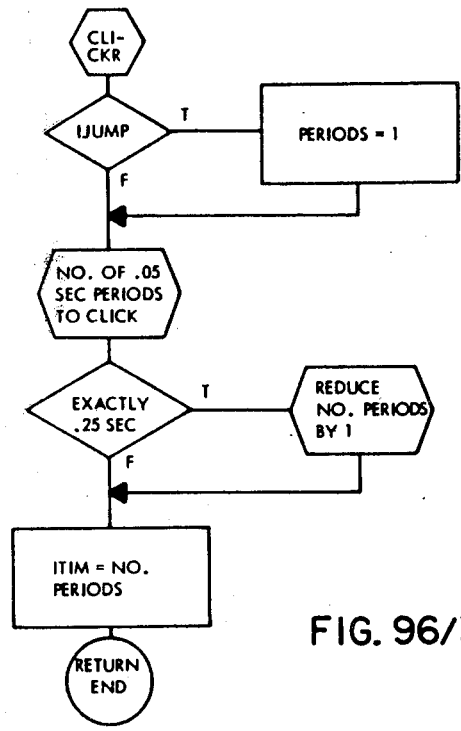
FIG. 96/38

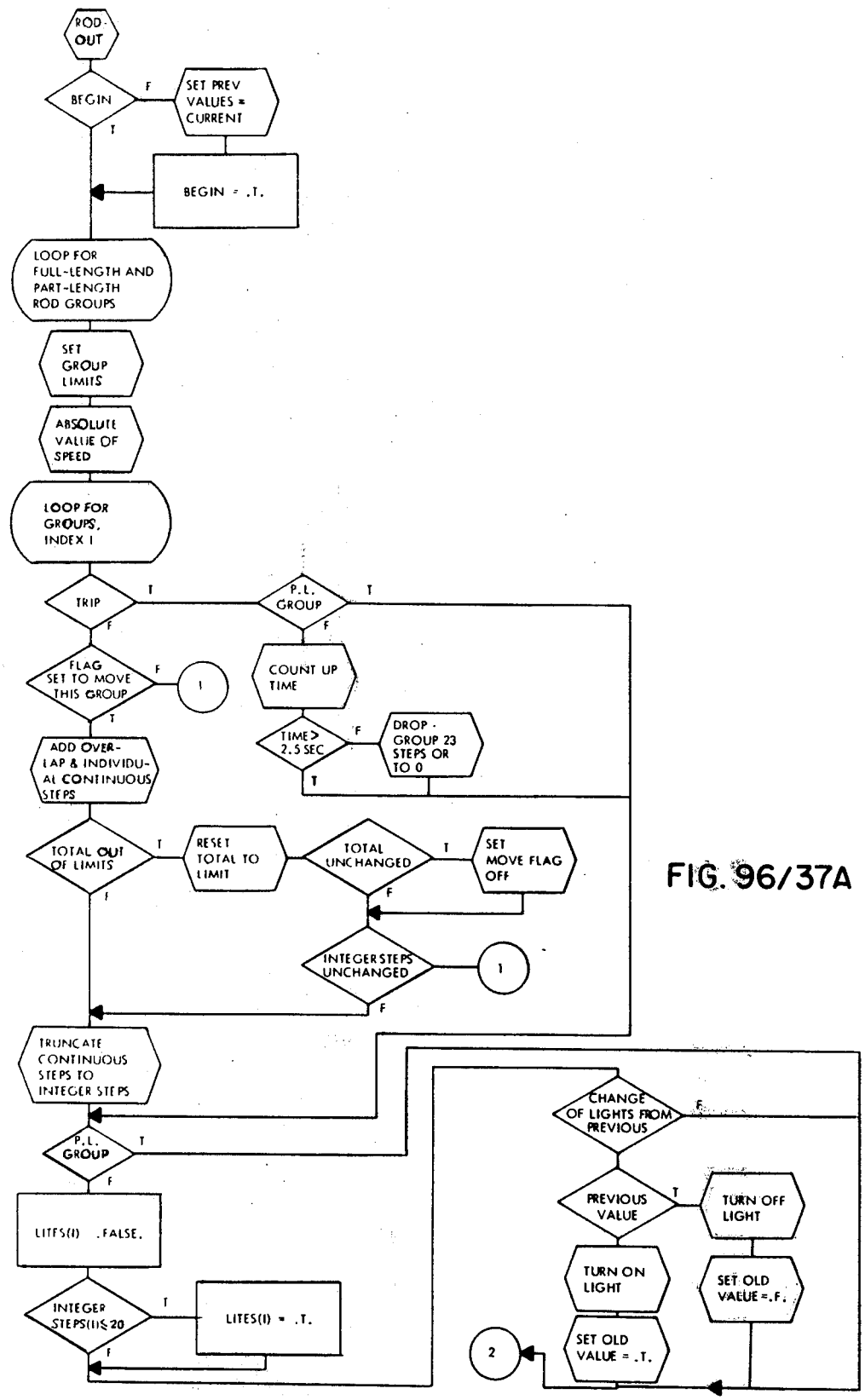
FIG. 96/37A

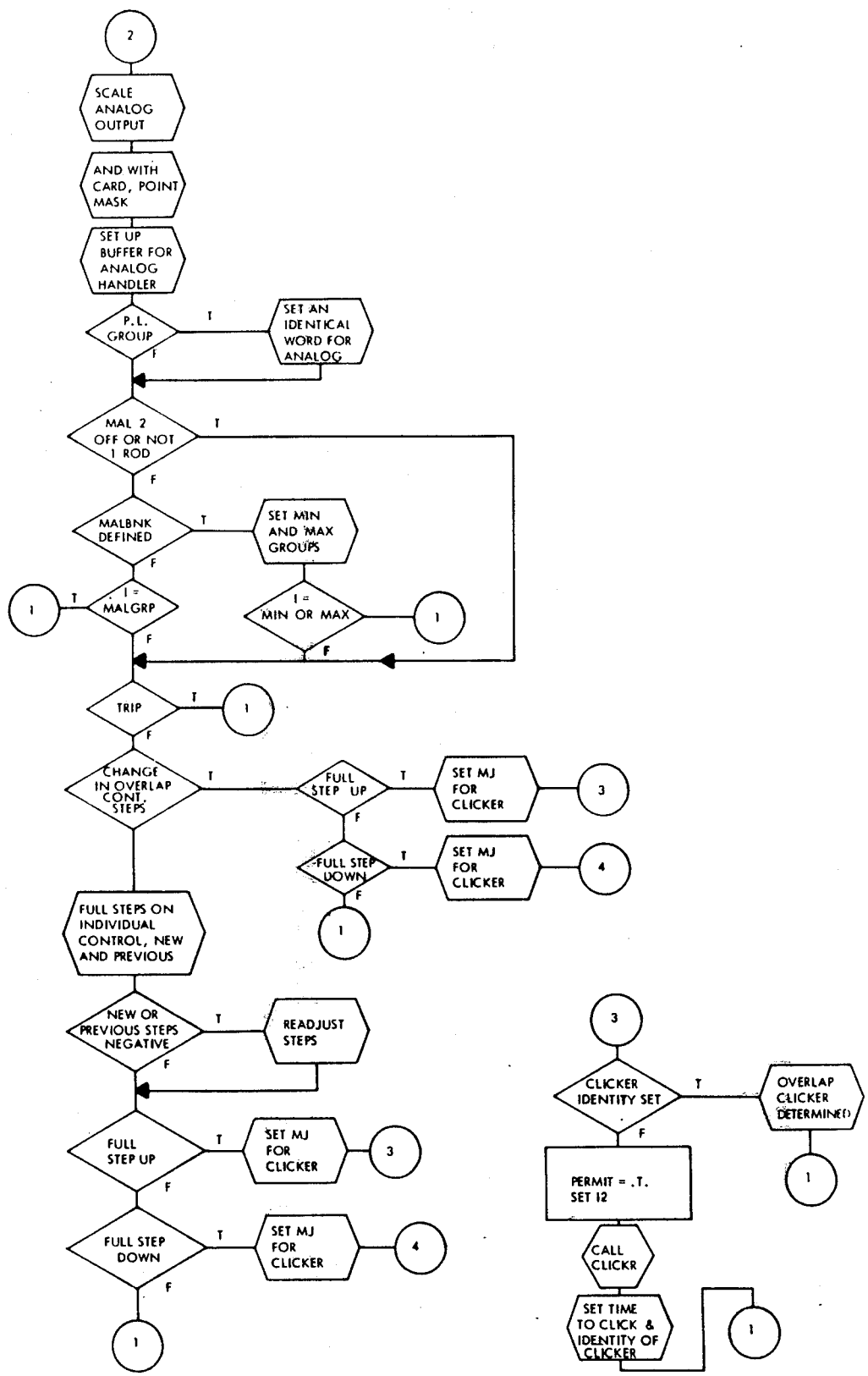
FIG. 96/37B

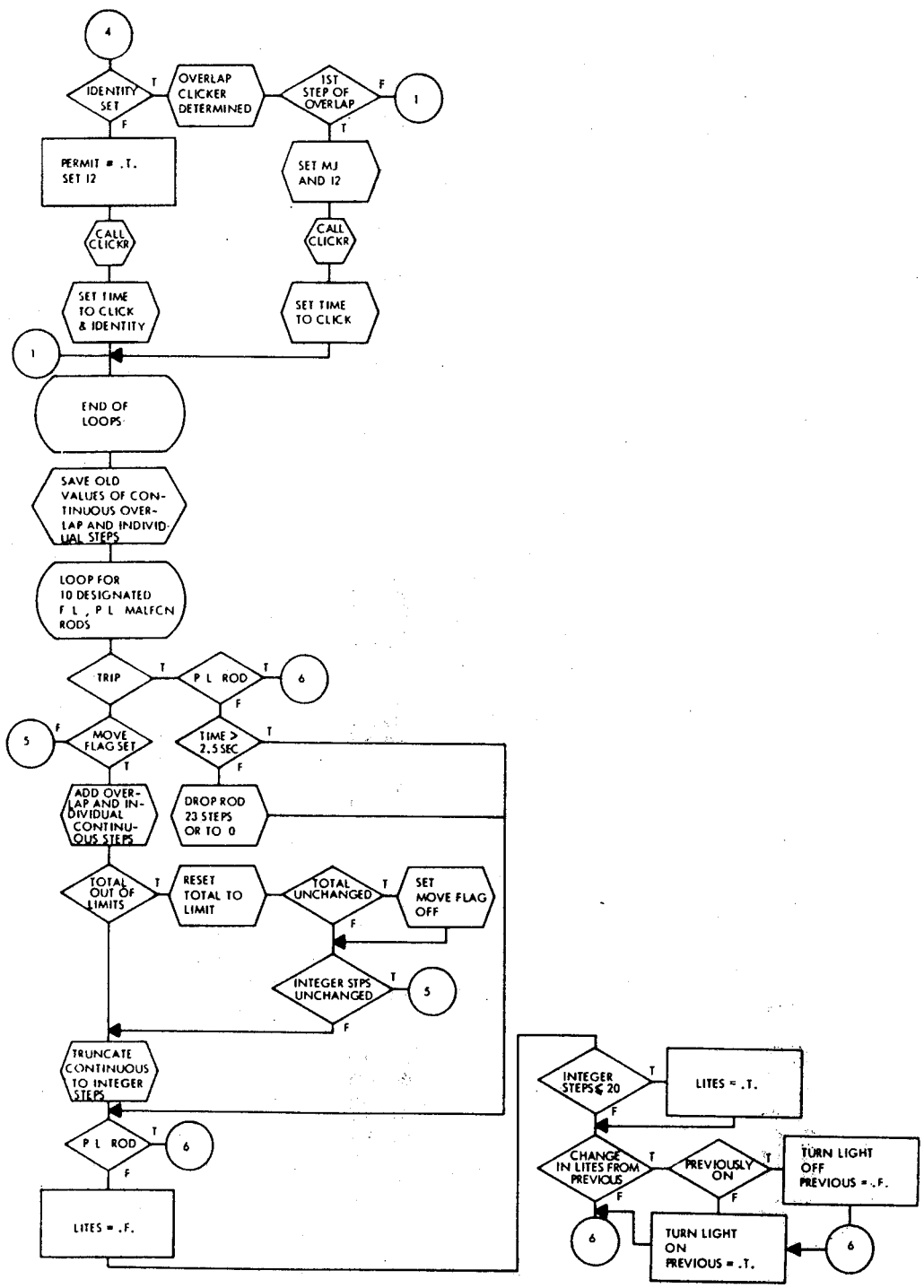
FIG. 96/37C

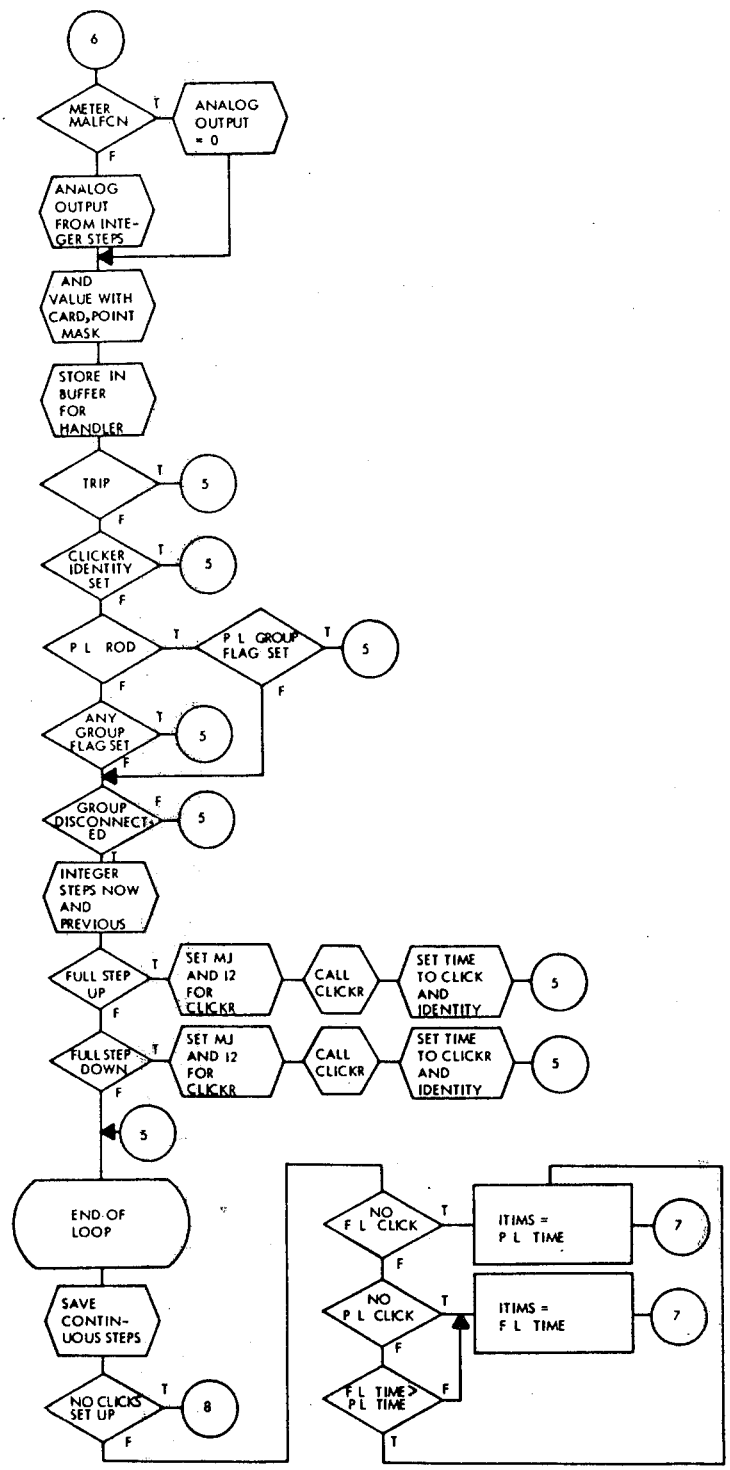
FIG. 96/37D

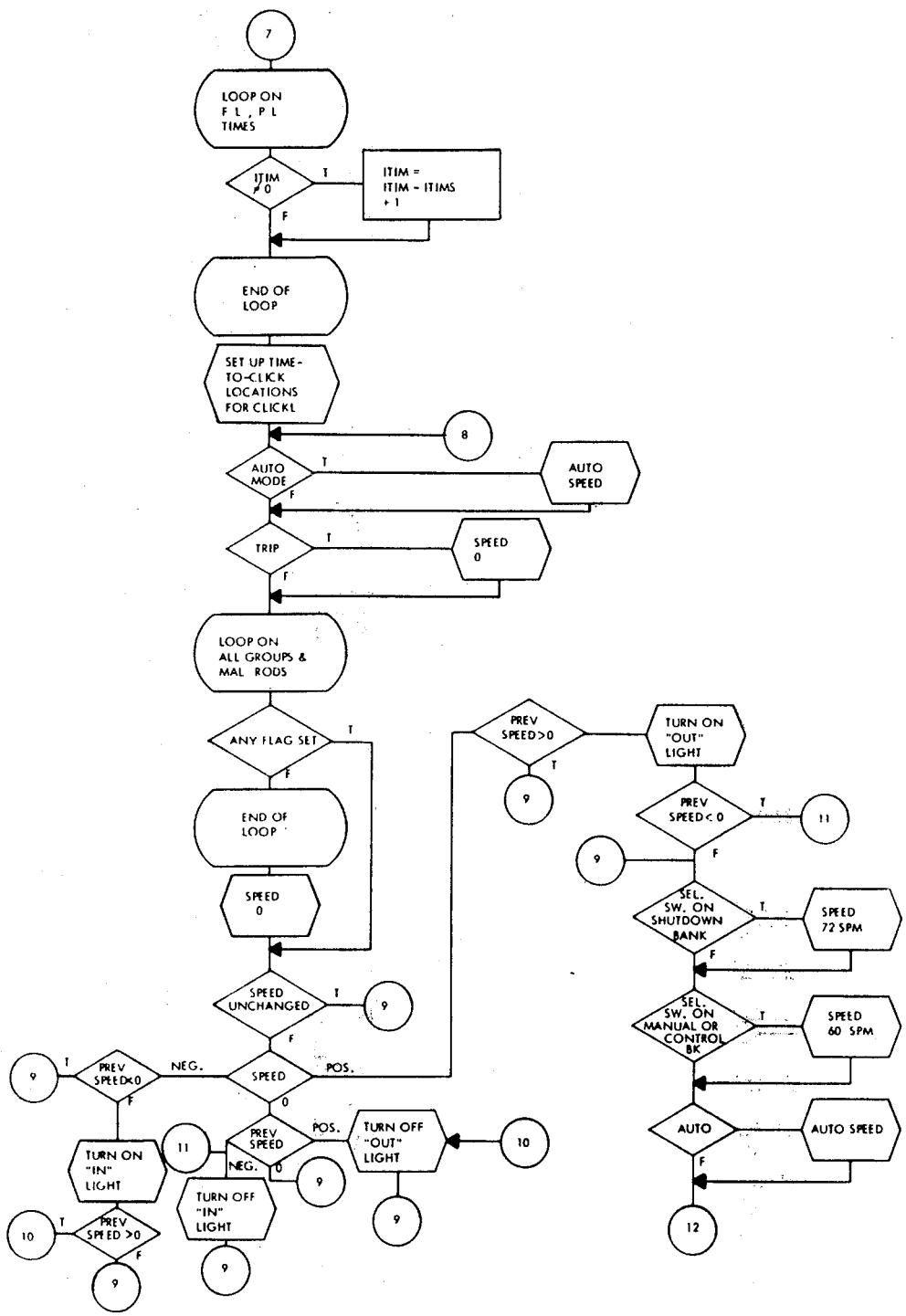
FIG. 96/37E

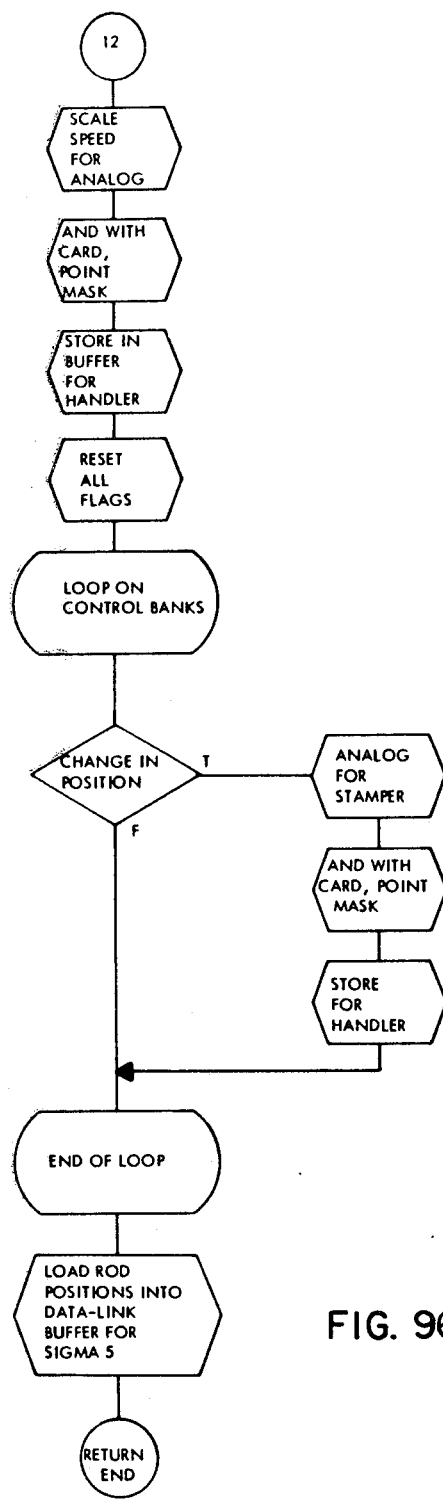
FIG. 96/37F

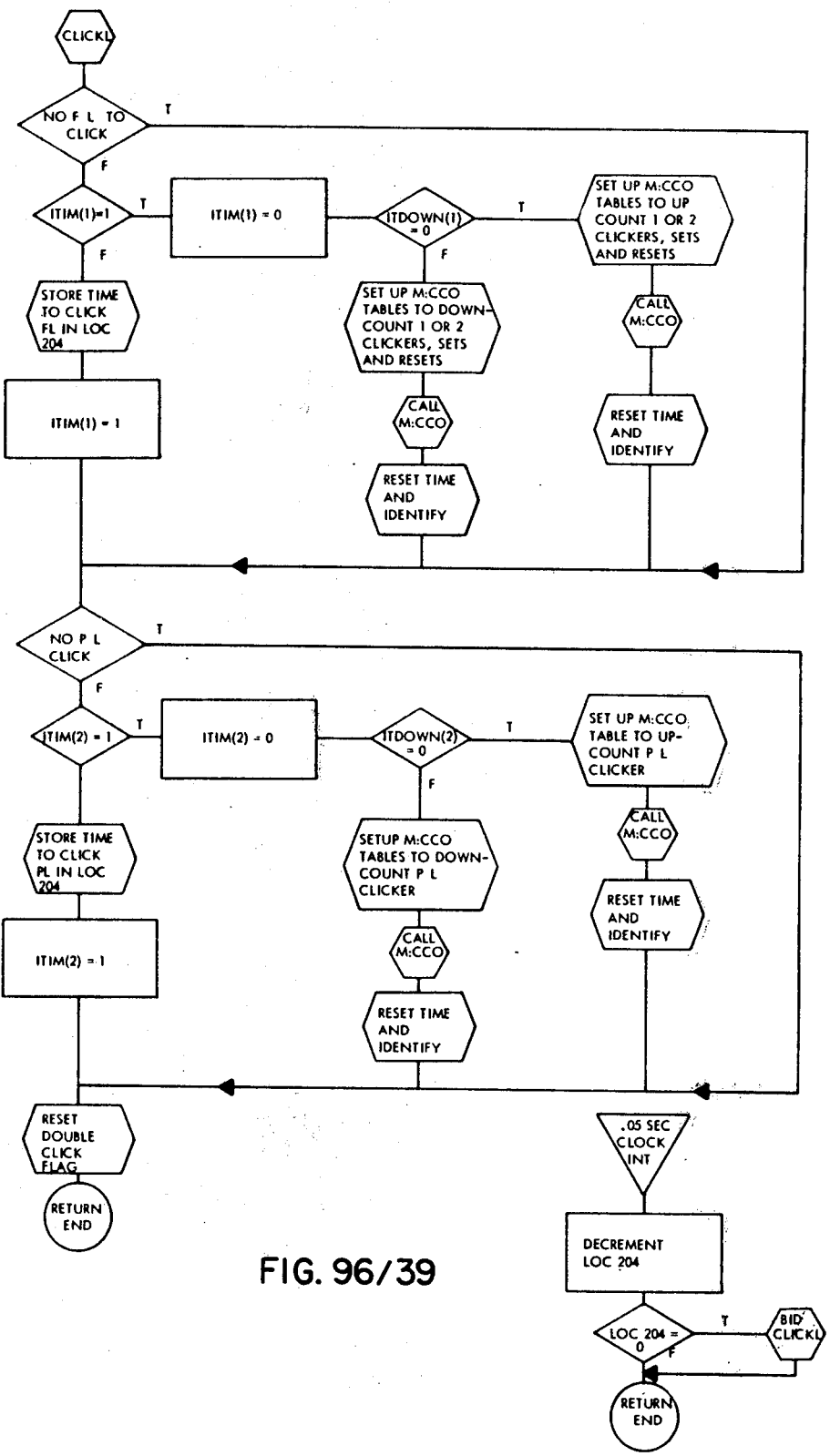
FIG. 96/39

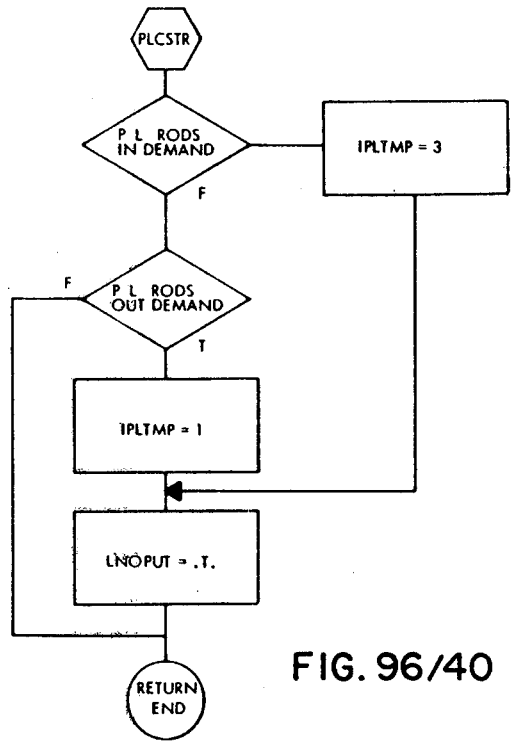
FIG. 96/40
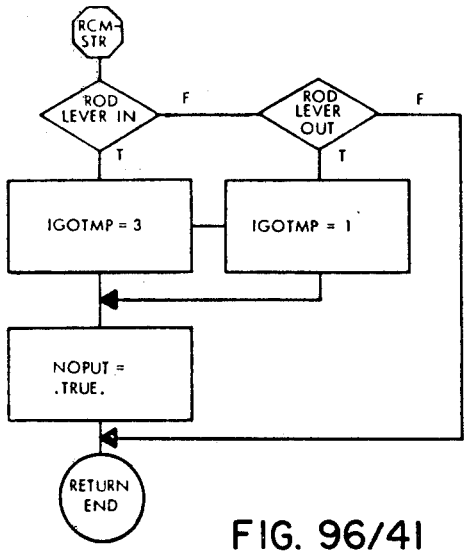
FIG. 96/41

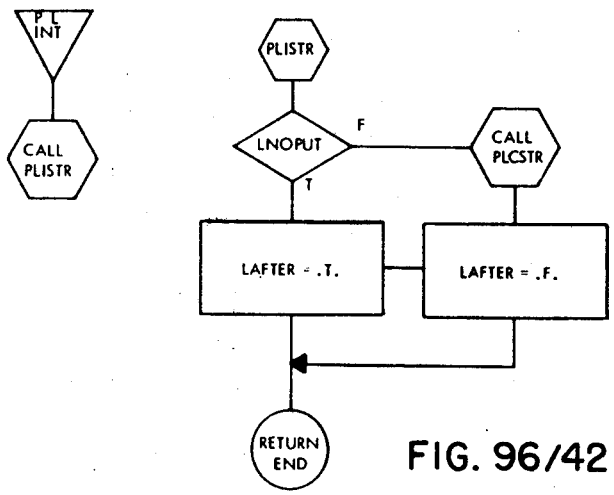
FIG. 96/42
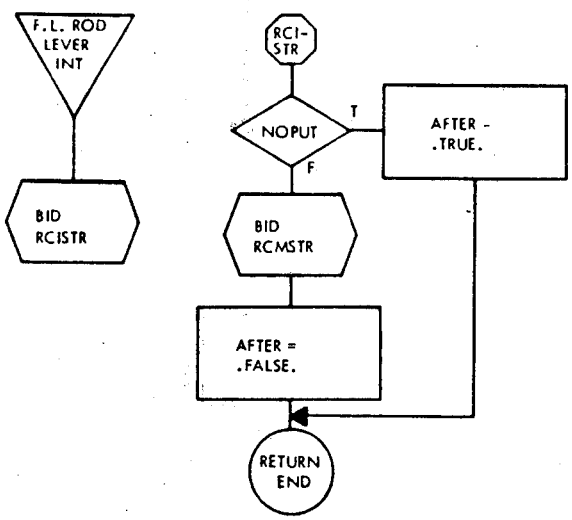
FIG. 96/43

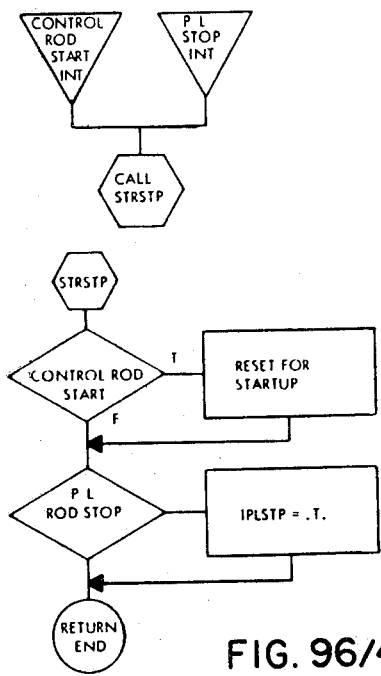
FIG. 96/44
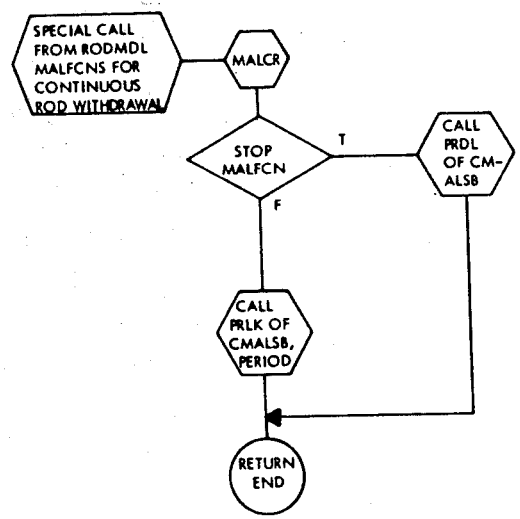
FIG. 96/45

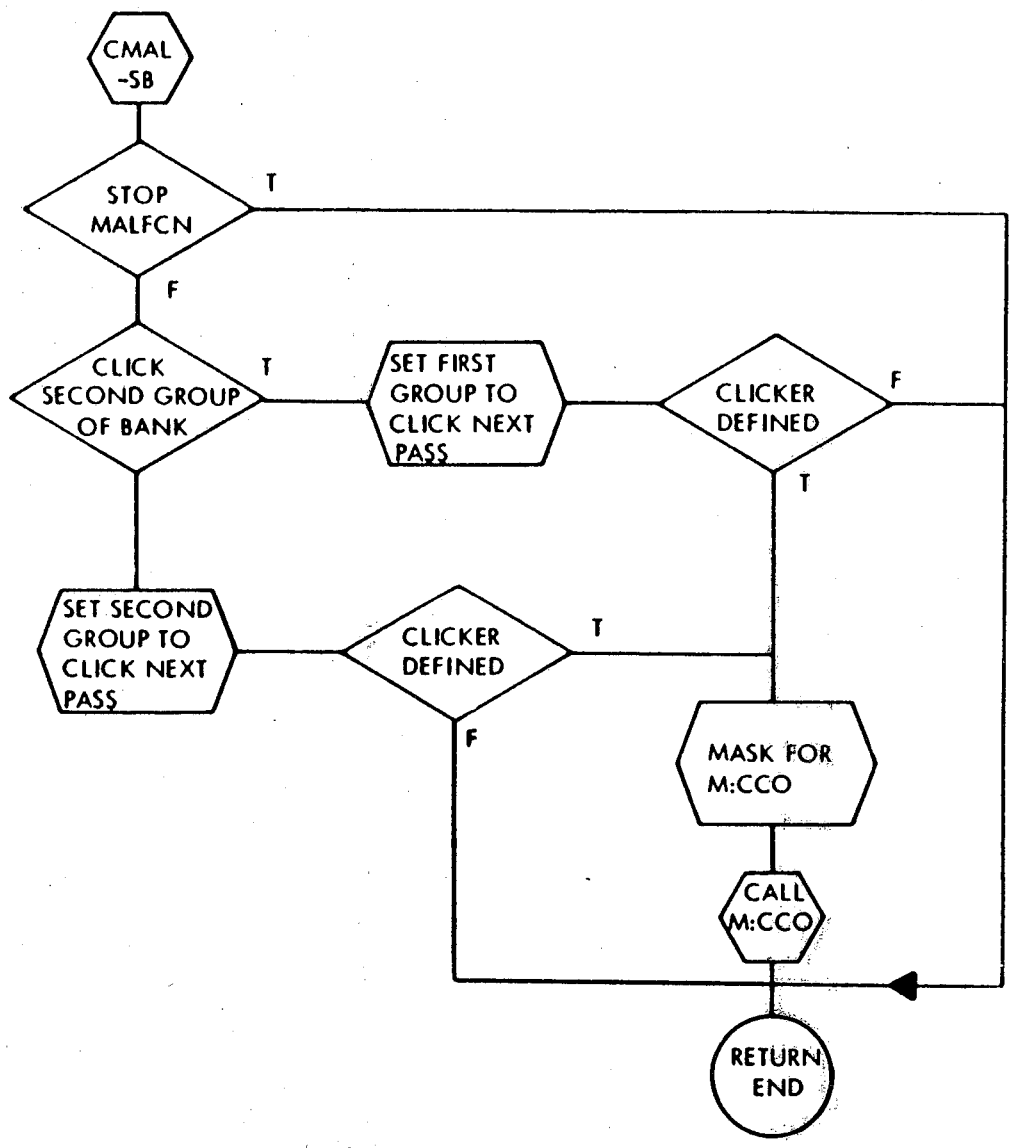
FIG. 96/46

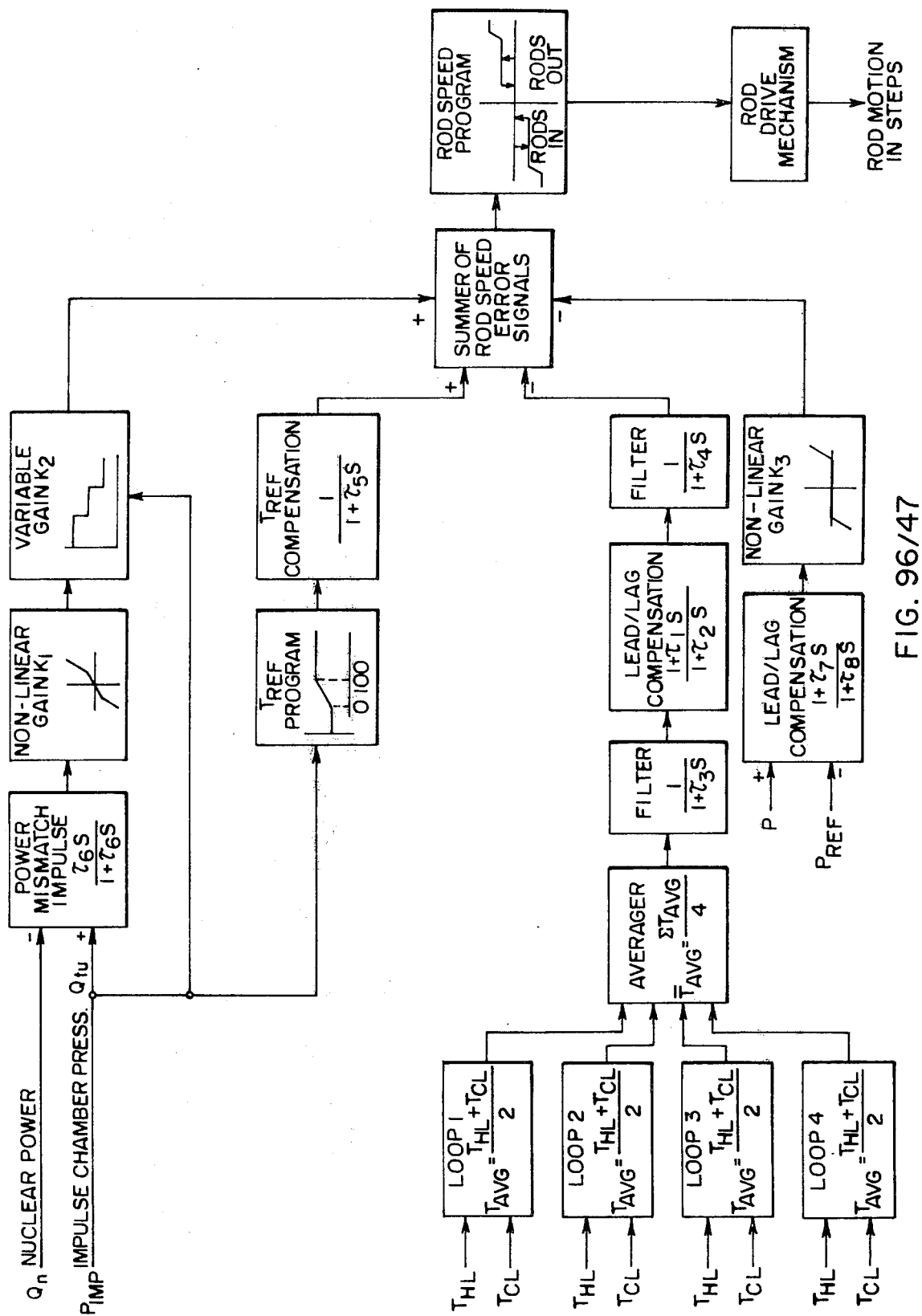
FIG. 96/47

TRAINING SIMULATOR FOR NUCLEAR POWER PLANT REACTOR CONTROL MODEL AND METHOD

CROSS-REFERENCES TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola on Feb. 23, 1973 in the U.S. Patent Office.

2. Ser. No. 335,286 entitled "Nuclear Power Plant Training Simulator System And Method" and filed by R. W. Ferguson and R. E. Converse on Feb. 23, 1973 in the U.S. Patent Office.

3. Ser. No. 335,295 entitled "Nuclear Power Plant Training Simulator Modeling Organization And Method" and filed by W. H. Alliston on Feb. 23, 1973 in the U.S. Patent Office.

4. Ser. No. 335,181 entitled "Training Simulator For Nuclear Power Plant Reactor Monitoring" and filed by W. H. Alliston, F. R. Czerniejewski and B. A. Mutafelija on Feb. 23, 1973 in the U.S. Patent Office.

5. Ser. No. 335,294 entitled "Training Simulator For Nuclear Power Plant Reactor Coolant System And Method" and filed by W. H. Alliston and A. A. Desalu on Feb. 23, 1973 in the U.S. Patent Office.

6. Ser. No. 335,285 entitled "Engineered Safeguards Systems And Method In Nuclear Power Plant Training Simulator" and filed by A. A. Desalu on Feb. 23, 1973 in the U.S. Patent Office.

7. Ser. No. 335,391 entitled "Fluid Distribution Network And Steam Generators And Method For Nuclear Power Plant Training Simulator" and filed by W. H. Alliston, S. J. Johnson and B. A. Mutafelija on Feb. 23, 1973 in the U.S. Patent Office.

8. Ser. No. 335,183 entitled "Training Simulator And Method For Nuclear Power Plant Heater And Non-Linear Modeling" and filed by B. A. Mutafelija on Feb. 23, 1973 in the U.S. Patent Office.

9. Ser. No. 335,293 entitled "Secondary System Modeling And Method For A Nuclear Power Plant Training Simulator" and filed by S. J. Johnson on Feb. 23, 1973 in the U.S. Patent Office.

10. Ser. No. 335,184 entitled "Data Communication And Method For Real-Time Plural Computer Configuration" and filed by F. G. Willard, N. Slavin and L. S. Schmitz on Feb. 23, 1973 in the U.S. Patent Office.

BACKGROUND OF THE INVENTION

The present invention relates to the full-scope real-time simulation of the dynamic operation of a nuclear powered electrical generating plant for training plant operators.

The increasing demand for well trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide thy operator with the required experience, such as starting up, changing load, and shutting down, for example, except after years of experience; and even then it is unlikely that he would observe the effect of important malfunctions and be able to take the best corrective procedures.

Although simulators have been used for many years, in power plant design, it is only recently that they have been used for power plant operator training. An article in the July 22, 1968 issue of Electrical World entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators " discusses the proposed installation of a pressurized water reactor simulator. In Volume 10, No. 5 of the publication "Nuclear Safety, " published during September and October 1969 is an article entitled "Training Nuclear Power Plant Operators With Computerized Simulators," and in the June 1972 issue of the publication "Power Engineering" there is an article entitled "Simulators" which describes a number of power plant operator training simulators presently in use or proposed.

Design simulators usually cover only a small part of the process, and may run slower or faster than real-time; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator.

The full scope simulation of a nuclear power plant for operator training is of such extensive scope that it is advantageous to provide as many modeling simplifications as possible within the limits of steady state and transient accuracy. The simulation of the power plant must be of sufficient detail and accuracy that the operator cannot distinguish between the behavior of the simulator and that of the actual plant under conditions of cold startup, hot restart, normal load changes, and numerous malfunctions causing a load cut-back or a complete shutdown.

It is understood that the source of energy for such a power plant is the nuclear reactor, and the dynamics and operation of practically every subsystem in the power plant is affected by small variations in reactor operation. Thus, for training operators, that portion of the simulation relating to the nuclear reactor must provide for extreme overall accuracy in its response during operation.

In an actual plant, the control rods for a nuclear reactor are usually operated by a stepping device that moves the rods in or out of the core in incremental steps or distances. This mechanism is activated by either a manual lever or an automatic rod control device that is responsive to plant operation. The levers usually have three positions, rod in, normal, and rod out. Upon the touch of the lever to either the "in" or "out" position, the mechanism responds immediately, and continues stepping the rods until the lever is released to its "normal" position. Also, if the lever is moved from either the "in" or "out" position, to the other operating position, there is a time delay before the reactor mechanism will respond to the change. When under control of the automatic rod control device, the speed of the rods can vary depending on the demand.

The control console of the actual plant usually has indicating devices or clickers that respond to each rod step of the drive mechanism as well as meters for indicating the position of the rods in the core. Also, there is usually provided a rod control program which starts movement of certain banks of rods when other banks reach a predetermined position in the core.

In simulating the indicating devices for the reactor control rods utilizing a digital computer, where calculations occur during successive time steps, it is desirable to provide realism even though the clickers may operate in real-time between computer time steps and the incremental distance traveled during each incremental time step may vary because of speed change. Also, a training simulator should be so structured that the rod mechanism will respond immediately to a touch of the rod control lever but will not respond to a quick back and forth movement. Finally, the complete rod control simulation, both manual and automatic should be simulated accurately in real-time.

SUMMARY OF THE INVENTION

In accordance with the broad principles of the present invention, an improved method and system for simulating the real-time dynamic operation of a nuclear power plant is provided, which utilizes apparatus wherein a plurality of control devices corresponding to the control apparatus for operating the plant, provide input data to a computer that calculates physical values during successive time steps for the improved simulation of a nuclear reactor.

In one aspect of the invention the improved method and system for simulating the real-time operation of a nuclear reactor rod control and indication means is characterized by computer means that operates rod movement indicating means to respond in real-time regardless of the computer time steps. In another aspect, a simulated rod control means responds immediately to a touch of a manual rod control lever but delays operation in response to a quick back and forth movement.

BRIEF DESCRIPTION OF THE DRAWINGS

FIGS. 96/31A and 96/31B illustrate the flow chart for the rod control program RODMDL;

FIG. 96/32 illustrates the flow chart for the rod control subroutine RODSEL;

FIG. 96/33 illustrates the flow chart of the rod control subroutine OVRLAP;

FIG. 96/34 illustrates the flow chart for the subroutine PLMOVE of the rod control simulation;

FIG. 96/35 illustrates the flow chart for the subroutine DISCON of the rod control simulation;

FIG. 96/36 illustrates the flow chart for the subroutine RECOVE of the rod control simulation;

FIGS. 96/37A through 96/37F inclusive illustrate the flow chart for the subroutine RODOUT for the control rod simulation;

FIG. 96/38 illustrates the flow chart for the subroutine CLICKR of the rod control simulation;

FIG. 96/39 illustrates the flow chart for the subroutine CLICKL of the rod control simulation;

FIG. 96/40 illustrates the flow chart for the subroutine RCMSTR of the rod control simulation;

FIG. 96/41 illustrates the flow chart for the subroutine PLCSTR of the rod control simulation;

FIG. 96/42 illustrates the flow chart for the subroutine PLISTR of the rod control simulation;

FIG. 96/43 illustrates the flow chart for the subroutine RCISTR of the rod control simulation;

FIG. 96/44 illustrates the flow chart for the subroutine STRSTP of the rod control simulation;

FIG. 96/45 illustrates the flow chart for the subroutine MALCR of the rod control simulation;

FIG. 96/46 illustrates the flow chart for the subroutine CMALSB of the rod control simulation;

FIG. 96/47 is a functional block diagram of the simulated automatic rod control system.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

Figure 92E:
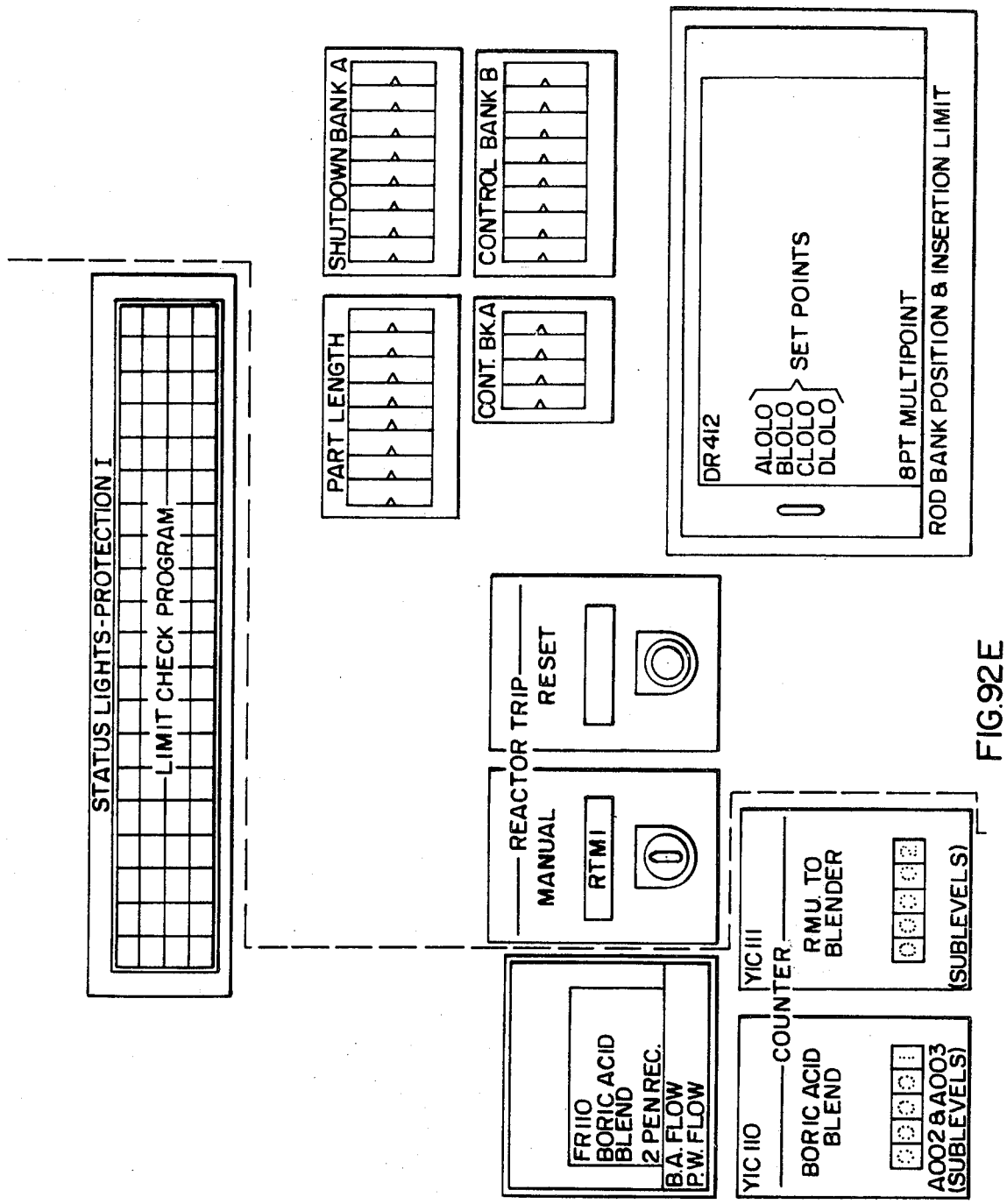
FIGS. 92E through 92H illustrate a front view of a portion of the control panels that include reactor rod control and monitoring.
Figure 92F:
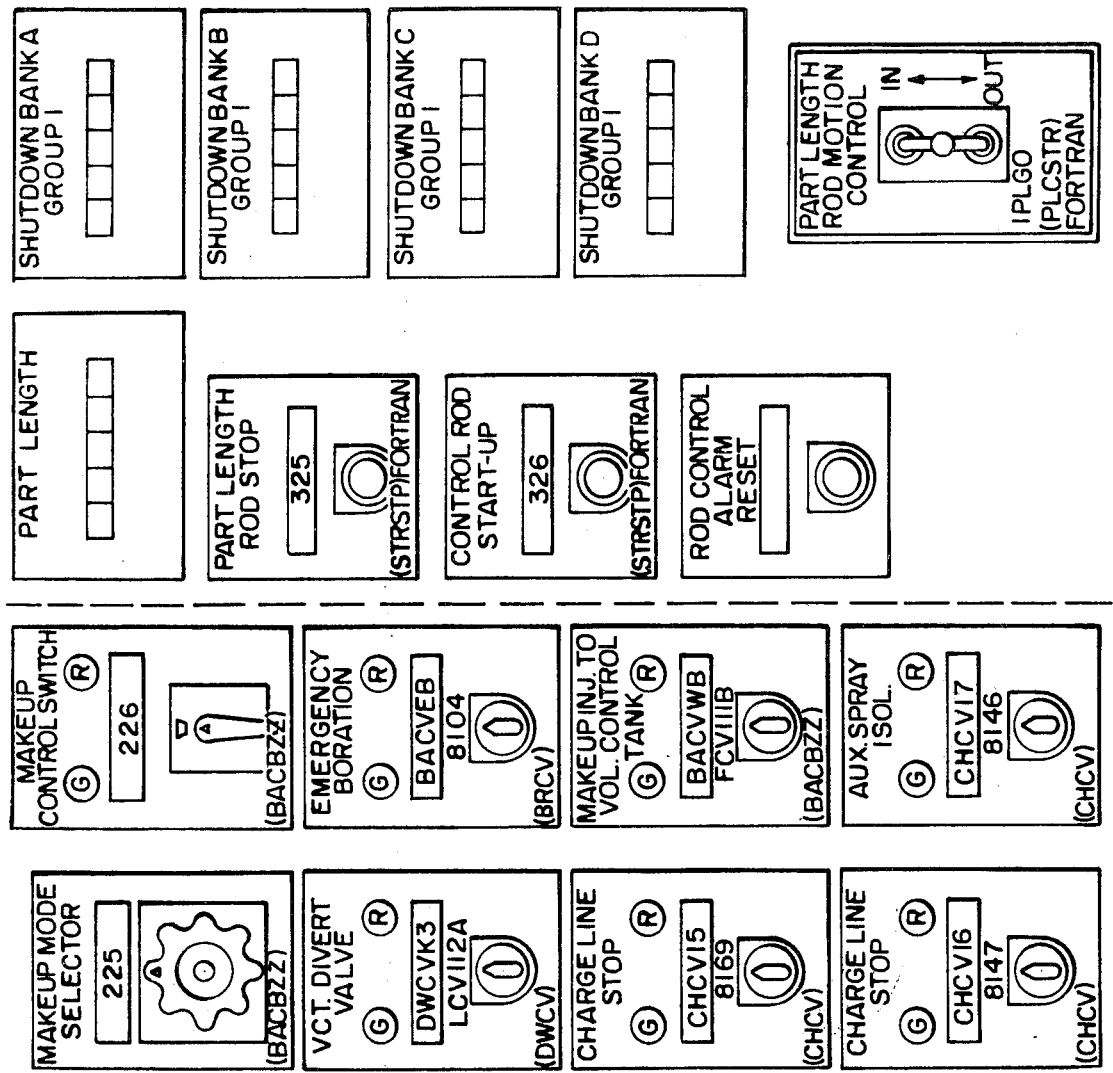
Figure 92G:
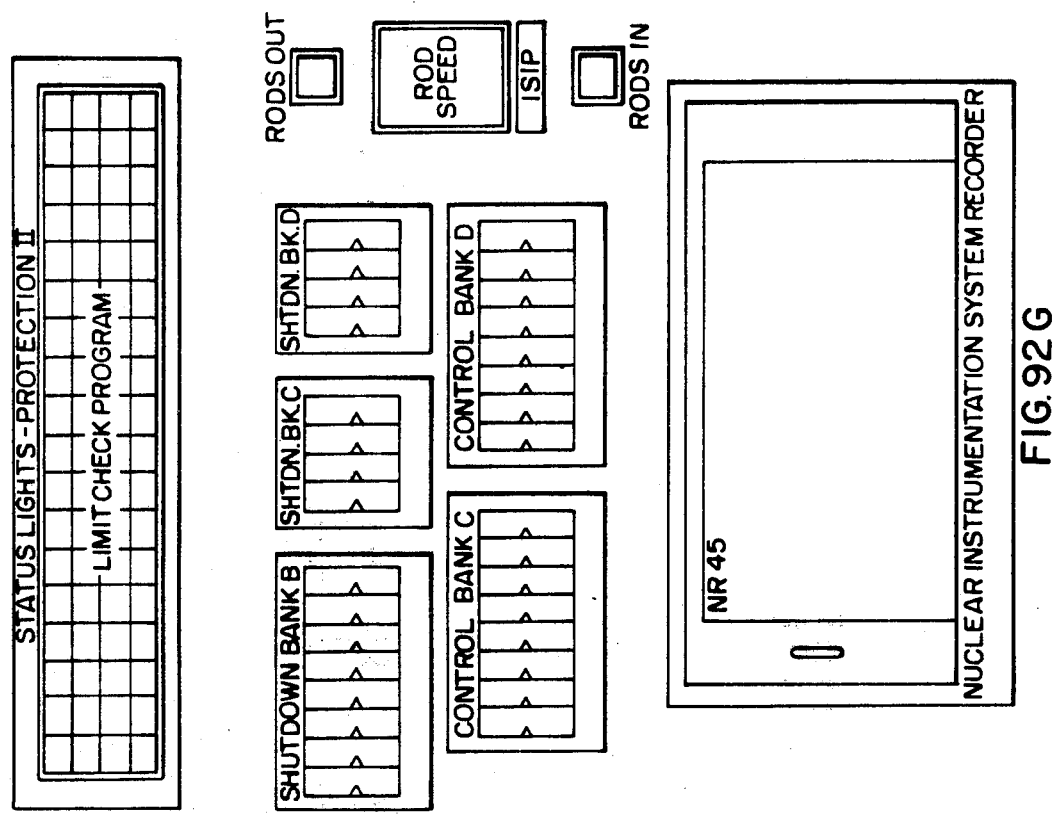
Figure 92H:
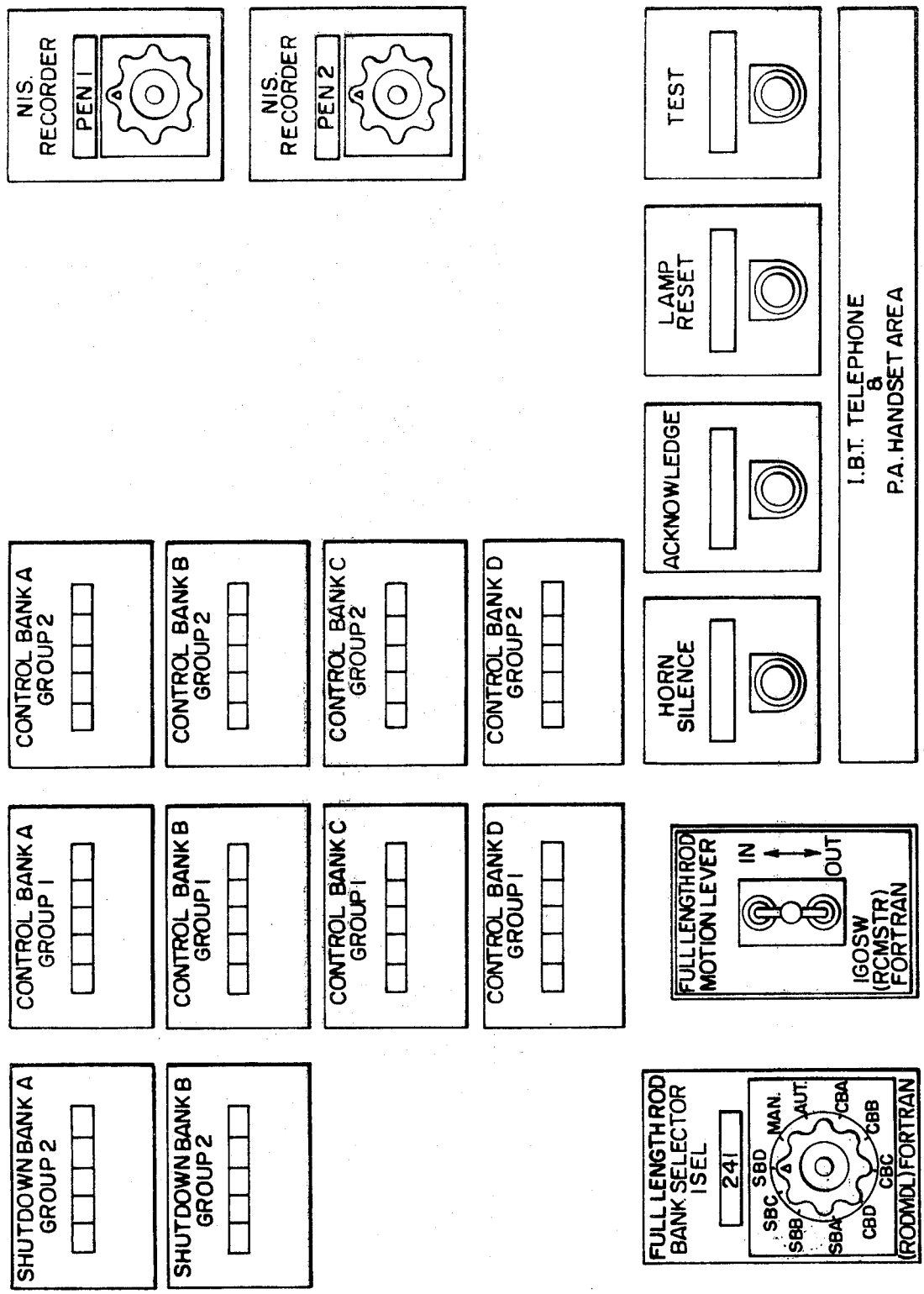

Referring to FIGS. 92E through 92H, there are four shutdown banks SBA, SBB, SBC, and SBD. The shutdown banks SBA and SBB are divided into two groups G1 and G2, respectively. There are four control banks CBA, CBB, CBC, and CBD. Each of the control banks are divided into respective groups G1 and G2. The part length rods are normally operated as a single unit from the central control office.

When the reactor is shut down all the full length rods 103 are rods in their fully inserted position. On the control panel of FIG. 92H, a ten position rod bank selector switch 1SEL is provided to select the manner in which the operator is to move the various control rod banks. He can either move each one of the shutdown banks SBA through SBD singly, or any one of the four control banks CBA through CBD singly. Additionally he can rotate the selector switch 1SEL to its manual position or its automatic position. During operation with the rod bank selector 1SEL in the automatic position, the rods will move depending on the temperature of the reactor and the turbine output power. In the manual position, such as when starting up the reactor for example, with the rod motion control rod lever held in its OUT position, the control bank CBA through CBD will commence stepping upwardly in the core in a serial manner with bank CBA first starting to move upwardly and then followed by CBB, CBC, and CBD as each one of the banks reaches a predetermined position along the axis of the core. Upon release of the rod motion control rod lever, the rods will stop in whatever position they may be in at the time the lever is released, once it completes the step it is on. With the rod lever in the IN position, the rods will commence traveling downwardly in the core in the reverse sequence to that which occurred when the rods were moving upwardly. All the part length rods are controlled by a single rod motion lever and moved upwardly or downwardly in the core depending upon the position of the control lever in incremental steps.

The digital counters labeled SBA through SBD and CBA thrugh CBD and PL are clickers that provide an audible click for every step that the rods take in moving upwardly and downwardly as well as informing the operator of the number of steps that the control rod drive mechanism has taken. When moving under automatic control in the core, each group G1 or G2 of a bank of rods move on alternate half steps where the rate can be varied from 6 to 72 steps per minute. Thus, each group moving on a half step, such meters would provide clicks that varied anywhere from 1 for every 5 seconds of operation to every five-twelfths of a second of operation.

The actual position of the individual control rods of a bank are illustrated to the operator by meters in FIGS. 92/F&H. Also, the operator can monitor the position of the control rod banks (CBA, CBB, CBC, CBD) by a recorder DR-412. To set the clicker meters to zero, the operator is provided with a rod control start up pushbutton. The part length rod stop pushbutton is utilized should the part length rod movement control lever stick or have some other malfunction.

Reactor Control Rod Simulation Software

The control rods in a nuclear reactor govern the fission in a reactor. When the control rods are fully inserted, the reactor is shut off and as they are withdrawn from the reactor, the fission rate and hence the heat of the reactor increases. The actual system also includes an automatic rod control system that responds to the load demand of the power plant, so that as the load demand increases or decreases, the control rods are operated accordingly.

The reactor control rods of the type being simulated are controlled by a latch assembly, consisting of gripper latches and armatures. Gripper latches engage a grooved drive shaft of the assembly to lift, lower and hold the shaft. The armatures are actuated by operating coils which are energized in a latch, lift and hold sequence for stepping the shaft upwardly or downwardly in the core. The rod sequence is simulated in the model T1 in the A machine by continuous variables which are truncated to integers for a position indication under the constraint of automatic or manual control, bank overlapping, rod disconnects, and the rod stop and trip logic. This model also includes rod malfunctions; and such malfunctions include rods that fail to move on demand, continuous rod outward or upward movement without actuation of the in-out lever, failure of the control bank to overlap, failure of the automatic controller, a dropped full length rod, actual position meter failure, part length rod or bank moved in opposite direction from that demanded, a complete group of a bank drops into the core, and a complete group slips 100 steps into the core.

The inputs to the T1 model include the automatic rod speed demand, and the operation of the control board as caused by the operator. The outputs of this model include the rod positions, and the control board outputs for the rods.

In the malfunction feature of the model, 10 individual rod clusters limited to no more than one cluster per group are able to be malfunctioned individually. The ten rods which have been selected for malfunction will follow their respective group position unless such malfunction occurs. If a group malfunction is inserted by the instructor, such individual malfunctioned control rods will also follow its group.

Actual rod positions are used for the space kinetics simulation calculation hereinafter described even if the rod position indicators are in error.

The rod positions are calculated and an output occurs during every operating cycle, that is every one-fourth second, for realism. The clicker meters which were previously described are updated at the nearest 0.05 second. In actual operation of the reactor, it has been determined that a rod takes about 2½ second to drop into the bottom of the core which is the equivalent of a constant drop of 23 steps per quarter of a second. Full length rod withdrawal is overridden by the rod stops for manual operation and automatic operation from the logic.

In the model, rod movement is assumed to be continuous internally but only when the rod position reaches the next integer will the operator see an increment on the meter. For example, if the rod speed signal, either automatic or manual, is 60 steps per minute each quarter second the continuous position will increase by one quarter step. However, since the operator only sees a complete step, the control board will show a change only after one second of accumulation. And inasmuch as the clickers are updated to the nearest five hundreths of a second, the operator has no more than one quarter second error in rod position and no more than five/hundreths of a second on the rod counters. Additionally, this method of operation alleviates the problem of a continuously variable rod speed demand from the automatic controller.

To control long term fuel burnup characteristics an automatic rod overlap simulation is used in the actual reactor that operates on the manual and automatic positions of the rod bank selector switch. Analytic functions were found which uniquely determine all group positions by using the integer truncation properties of Fortran during the time that the overlap program is operative. Also, in the actual operation of the reactor when a group or an individual rod drops into the core, it must be retrieved by the operator using the individual rod disconnect switches previously mentioned. The only possibilities permitted if the operator is attempting to move control rods are that either there are no rod disconnect switches thrown on the bank that he is moving or he has correctly disconnected the rods which have not malfunctioned in that bank. If he incorrectly uses the rod disconnect switches, the simulator will type a message to the instructor. The modeling includes the following subroutines hereinafter described.

Referring to the flow chart of FIGS. 96/31A and 96/31B, the routine RODMDL is a "main" program that includes most of the malfunctions. It first checks for changes in the malfunction bits and sets the appropriate logicals and internal variables. For example, a rod drop causes a timer to start and run for 10 consecutive cycles, or in other words 2½ seconds, while the rod drops. Subsequently, the date link is called to reset the malfunction automatically; and the logic is tested for a trip in which instant no malfunctions are processed. The next procedure is the processing of the malfunctions wherein several of them specify a rod, or a group or a bank malfunctioning. If either a group or a bank is specified then any of the ten random malfunctioning rods which belong to that group or bank follow the specified malfunction. The continuous withdrawal malfunction activates a special routine to count up the digital clickers on the control panel while the internal variables keep pace. Certain rod malfunctions require that the rods do not respond to the manual or automatic control such as sticking or non-overlapping. The variables which are set in the routine RODMDL for this situation are checked later in the subroutine RODSEL. The decisions which are made to permit changes of the internal variables which cause rod movement is responsive to the digits of the rod control levers. In the actual reactor, there is a 0.75 second time delay before an out signal can change to an in signal on the rod motion control lever, even though the operator can move such levers back and forth rapidly. The routine RODMDL calls the routine DISCON to check the rod disconnect switches and an error message is printed if necessary, as considered subsequently herein, and the main program calls the routines RODSEL, PLMOVE, and RODOUT.

Referring to the FIG. 96/32 flow chart, subroutine RODSEL changes the internal variables for the full length non-overlapping rods, under the constraints of malfunctions, rod connects, first touch, reactor trip, rod stops and bank selector switch, and the in-out lever positions. The rod speed depends on the selector switch positions; and if the selector switch is in the manual or in the automatic position the subroutine OVRLAP is called.

Referring to the flow chart of FIG. 96/33 in the subroutine OVRLAP the two banks of an individual group are moved together, that is one-half step out of phase, and a count is kept of the number of steps taken by such rods under the overlap control. The simulation is so constituted that malfunctions can defeat overlap as well as rod stops and reactor trips. The first touch of the in-out lever is active, and internal variables are reset to keep the overlapping banks together.

Referring to the flow chart of FIG. 96/34, the subroutine PLMOVE updates the internal variables for the part length rods under the constraints of malfunctions, rod disconnects, the first touch of the full lengths and the part lengths in-out lever. The movement of the rods are delayed by 0.75 second for instantaneous change of direction.

Referring to the flow chart of FIG. 96/35, the subroutine DISCON which is called by the subroutine RODMDL, tests the rod disconnect switches; and if any are thrown for rods in that particular bank being moved, they must be used correctly, or a message is typed to the instructor informing him that the operator trainee has errored, and the rod simulation is no longer realistic. The subroutine DISCON calls RECOVE if a group has just been reconnected.

Referring to the FIG. 96/36 flow chart, the subroutine RECOVE realigns the internal variables to preserve the one-half step phase difference between groups when one group of a bank is reconnected after having been moved individually.

Referring to the flow chart of FIGS. 96/37A through 96/37F, the subroutine RODOUT which is called by the subroutine RODMDL processes all the information to set up control panel outputs such as the rod clickers, the meters, rod speed indicator and in-out lights. Full length and part length groups and individual malfunction rods are handled separately. The internal variables representing overlapping program control and individual group selection control are summed and limit checked. If the sum of the variables representing overlapping program control or individual group selection control has passed an integer, that is 99.7 to 100.1 for example, control panel outputs are set corresponding to 100 full steps.

Referring to the flow chart of FIG. 96/39, the clicker program CLICKL variables are set up by interpolating the time in 0.05 second increments using the last position 99.7, the integer set point (100) and the rod speed. Interpolation is performed by the subroutine CLICKR the flow chart for which is shown in FIG. 96/38, which routine does the set and reset calls to activate the clickers at their proper time. Analog outputs are calculated by the actual position meter display, which displays the actual rod positions, noting malfunctions. The rod bottom lights on the Reactor Control Panel for rods below 20 steps from the bottom of the core are activated. The routine RODOUT also calculates the analog outputs to the rod position recorder and sends the rod positions to the "C" machine for the space kinetics model hereinafter described.

Referring to the flow charts of FIGS. 96/40 and 96/41, the routine RCMSTR or PLCSTR is activated by the first touch of the full length in-out rod control lever and the part length in-out rod control lever respectively; and it stores a temporary variable for the in-hold-out position and disallows further inputs until the model processes the temporary storage.

Referring to the flow chart of FIG. 96/42, the routine PLISTR inhibits the running of the routine PLCSTR for part length rods, until the completion of the processing of the temporary storage of the variables. Referring to the flow chart of FIG. 96/43, the routine RCISTR, inhibits the running of the routine RCMSTR for the full length control rods until the processing of the temporary storage.

Referring to the flow chart of FIG. 96/44, the routine STRSTP resets the necessary internal variables when the pushbutton "control rod startup" is operated on the control board. Finally, referring to FIG. 96/45, the flow chart subroutine MALCR initiates or terminates as the case may be, continuous rod withdrawal malfunction for the rod clicker-counters; and after this subroutine MALCR is activated, the subroutine CMALSB, the flow chart for which is shown in FIG. 96/46, is called periodically to update the clicker for the continuous withdrawal malfunction.

Automatic Rod Control (RODGO)

When the rod selector switch on the control panel is in the automatic position, the movement of the banks of control rod are in the automatic mode. In the control system being simulated, a controller is provided which maintains a program average reactor coolant temperature which rises in proportion to load. It also limits nuclear plant system transients to prescribed limits about this program coolant temperature for specified load perturbations.

Resistance thermometers are installed in each of the reactor coolant loops to measure the average loop temperatures $T_{avg}$. The resistance elements in each cool leg in conjunction with the elements with the associated hot legs provide resistance inputs to produce electrical outputs proportional to the average temperature $T_{avg}$ in each reactor coolant loop. The controller compares the highest of these loop temperatures $T_{avg}$ with the program temperature which is a proportional function of the turbine load. Such controller then directs the movement of preselected groups of control rod clusters to increase or decrease reactor power as required to maintain the desired average temperature.

Referring to FIG. 96/47, a block diagram of the automatic rod control system being simulated, is shown. In addition to the average temperature, and an error signal derived therefrom, the nuclear or fission power QN and the turbine load presented by impulse chamber pressure $P_m$ imp are combined to produce an error signal which is summed with the temperature error signal to operate the rod speed control for ultimate operation of the rod drive mechanism to either move the rod inwardly or outwardly in the reactor core.

A simulation of the rod speed controller is obtained by a transform approximation thereof. The inputs to the program for such simulation in the model T2 include the auctioned average coolant temperature, reactor power, and turbine impulse pressure. The outputs of the simulation include the automatic rod speed demand.

The Z-transform technique is utilized for the transfer function of the analog controller elements. The controller error signal is developed as a function of reactor coolant loop temperatures, turbine load or power (through impulse stage steam pressure) and the nuclear instrumentation system indicated power (rate compensation). It further includes the rod speed deadband and the proportional band control function.

Equations for such mechanization are as follows:

$$B = \frac{t_2 S + 1}{(t_1 S + 1)(t_3 S + 1)} T_{av}$$

$T_{in} = 12.4 \times$ Fractional Turbine Impulse Pressure $+ 547.$ $$T_{REF} = \frac{1}{t_5 S + 1} T_{in}$$

$\Delta$ Power = Fractional Reactor Power-Fractional Turb. Imp. Pressure $$of = \frac{t_6 S}{1 + t_6 S} \text{Power}$$

Y = Non-Linear Function X X $\begin{Bmatrix} Z = 2, \text{ if } X < 0.3 \\ 1.5, \text{ if } 0.3 \quad x \\ 1, \text{ if } x > 0.7 \end{Bmatrix}$ 0.7 X Y.

$T_{ERROR} = T_{REF} - B - Z$

The rod speed is a function of $T_{ERROR}$. There is a dead band of 1.5° followed by a speed of 6 steps/min for $T_{ERROR}$ between 1.5° and 3°. From 3° to 5°, the rod speed signal follows the functions 33* $T_{ERROR}$-93. Above 5° the rod speed is a maximum 72 steps/min. A rod speed signal is retained at 6 steps per minute down to 1° if $T_{ERROR}$ is decreasing. Negative rod speeds (i.e., insertion) follow in an identical pattern for $T_{ERROR} < 0$.

A derivation of the Z-Transform of a sample transfer function is included below for completeness.

$$B = \frac{t_2 S + 1}{(t_1 S + 1)(t_3 S + 1)} T_{av}$$

Allow $T_{ave}$ to be a step (i.e., sampled) input of $T_{ave/S}$, the full transfer function is:

$$\frac{1}{S} \frac{t_2 S + 1}{(t_1 S + 1)(t_3 S + 1)} = \frac{1}{S} + \frac{t_1(t_1 - t_2)}{t_3 - t_1} \left[\frac{1}{t_1 S + 1}\right] + \frac{t_3(t_2 - t_3)}{t_3 - t_1} \left[\frac{1}{t_3 S + 1}\right]$$

LET $C_1 = \frac{t_1 - t_2}{t_1 - t_1}$ and $C_2 = \frac{t_2 - t_3}{t_3 - t_1}$

The Z-Transform function is, from tables:

$$\frac{Z-1}{Z}\left\{\frac{Z}{Z-1}+\frac{C_1 Z}{Z-C-t/T_1}+\frac{C_2 Z}{Z-C-t/T_3}\right\}=1+\frac{C_1(Z-1)}{t-D_1}+\frac{C_2(Z-1)}{Z-D_2}$$

where $D_1 = e^{-t/T_1}$ and $D_2 = e^{-t/T_3}$ and $t$ is the sampling time, one-fourth second here. So $$B = \frac{(Z-D_1)(Z-D_2)+[C_1(Z-D_2)+C_2(Z-D_1)](Z-1)}{(Z-D_1)(Z-D_2)} T_{ave}$$

$$1-\left(\frac{D_1+D_2}{Z}+\frac{D_1 D_2}{Z^2}\right)\left\{B = (1+C_1+C_2) - \frac{D_1+D_2+C_1 D_2+C_1+C_2 D_1+C_2}{Z}\right.$$

$$\left.+\frac{(D_1 D_2+C_1 D_2+C_2 D_1)}{Z^2}\right\} T_{ave}$$

It is well known that the inverse transform is
$Z^{-N}(X) = X(-nt)$
Therefore
$B(t_o) = (D_1+D_2)B(t_{-1}) - D_1 D_2 B(t_{-2}) - (D_1+D_2+C_1 D_2 + C_1+C_2 D_1+C_2)T_{ave}{}^{(t-1)}$
$+(D_1 D_2+C_1 D_2+C_2 D_1)T_{ave}{}^{(t-2)}$ Hence, given previous values of $B$ and $T_{ave}$, $B(t_o)$ can be determined.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. It is further understood, that with respect to the individual models, that the changing of one or more models in the simulator does not affect the system, method, or operation of other models in the simulator.

Reference is made to U.S. patent application bearing Ser. No. 333,901 entitled "Training Simulator For A Nuclear Power Plant" and filed by G. L. Gregg, R. E. Putman and J. W. Gomola which is assigned to the present assignee and filed concurrently herewith; and which is incorporated herein by reference and made a part hereof.

What is claimed is:

1. An automated training simulator for the real-time dynamic operation of a nuclear reactor, said nuclear reactor being controlled by movable rods having remote control means operable to raise and lower the rods discrete incremental distances during variable successive time intervals with each incremental distance of rod travel being indicated at the remote control location; said simulator comprising:

command means for generating signals corresponding to desired rod motion;
calculating means operative to generate output data repetitively at fixed time intervals,
said calculating means including sequence controlling means having the following components (a) means governed by the operation of the command means to generate at each fixed predetermined time interval a data value relating to the fractional parts of said fixed time interval in accordance with distance and speed of rod movement as required by the command means,
b. means governed by the data value relating to the fractional time generated during each said fixed time interval to generate an output signal at times representative of the incremental distance of rod travel; and
indicating means responsive to each generated output signal to indicate rod travel through each incremental distance.

2. An automatic training simulator according to claim 1 wherein the calculating means is structured in a programmed digital computer, and the fixed time interval is the time step of the digital computer.

3. An automated training simulator for the real-time dynamic operation of a nuclear reactor, said nuclear reactor being controlled by movable rods which are remotely controlled by means operable to raise and lower the rods discrete incremental distances during variable successive time intervals, each incremental distance of rod travel being indicated at the remote control location; said simulator comprising:

command means relating to the control of desired rod motion;
means responsive to the operation of the command means to generate input data representative of the desired rod motion;
calculating means operative to generate output data repetitively at fixed time intervals,
said calculating means including sequence controlling means having the following components (a) means to generate during each said fixed time interval a first data value relating to the desired incremental distance of rod travel during such interval in accordance with the generated input data,
b. means to store during each said fixed time interval a second data value generated during a preceding said fixed time interval relating to the position of the control rod,
c. means governed by the first ganerated data value and the stored second data value to generate during each said fixed time interval the second data value relating to the position of the control rod,
d. means governed by the generated second data value to generate during each said fixed time interval a third data value relating to a fractional incremental distance of control rod travel,
e. means governed by the generated third data value to generate a fourth data value relating to a fractional time of the fixed interval in which the control rod is to move, f. means governed by the fourth data value to generate an output signal independent of the said fixed time interval each time the control rod is commanded to move an incremental distance;

and means responsive to each output signal to indicate control rod travel.

4. An automatic training simulator according to claim 3, wherein said sequence controlling means includes means to operate the indicating means to indicate a complete incremental movement in response to the generated fractional incremental distance.

5. An automated training simulator according to claim 4 wherein the calculating means is structured in a programmed digital computer, and the fixed time interval is each time step of the computer.

6. An automated training simulator according to claim 3 wherein the calculating means is structured in a programmed digital computer, and the fixed time interval is each time step of the computer.

7. An automated training simulator according to claim 3 wherein the command means corresponds to an automatic control device for controlling the rods at varying speeds; and said sequence controlling means includes means to generate data relating to other physical values in the operation of the reactor to operate the automatic control device.

8. An automatic training simulator according to claim 3 wherein the indicating means operates to provide an audible indication in response to rod travel through each incremental distance.

9. An automated training simulator for the real-time dynamic operation of a nuclear reactor in which the reactor power is controlled by a manually operable means for activating a control mechanism which continually moves the rods in one or the other of two directions while the manual means is operated to one or the other of its operating positions and said mechanism responds immediately to the movement of the manual means for either direction of movement, but delays response to quick operation of the manual means from one operating position to the other operating position; said simulator comprising;

a manually operable means corresponding to the device for activating the control mechanism for generating first or second input data corresponding to its operated position;

calculating sequence controlling means having the following components means including (a) means to generate repetitively during successive fixed time intervals, output data related to control rod position for an indicating means;

b. means to generate during each said fixed time interval a third data value relating to one direction of rod movement during such interval in response to the first input data generated upon the operation of the manually operable means to its one position, c. means to generate during each said interval a fourth data value related to the other direction of rod movement in response to the second input data generated upon the operation of the manually operable means to its other position, d. means to render the rod movement unresponsive to the first and second input data in response to the operation of the manual means for a predetermined length of time subsequent to the removal of second and first input data, respectively; and indicating means responsive during each said fixed time interval to the generated third and fourth data value to monitor the rod position.

10. An automated training simulator according to claim 9 wherein said sequence controlling means further includes means to render the rod movement related data unresponsive during a predetermined number of fixed time intervals to any changes of input data subsequent to the last response of rod movement to input data.

11. An automated training simulator according to claim 10, wherein the calculating means is structured in a programmed digital computer, and the fixed time interval is each time step of the computer.

12. An automated training simulator according to claim 9, wherein the calculating means is structured in a programmed digital computer, and the fixed time interval is each time step of the computer.

13. An automated training simulator for the real-time dynamic operation of a nuclear reactor in which the reactor power is controlled by a manually operable means for activating a control mechanism which continually moves the rods in one or the other of two directions while the manual means is operated to one or the other of its operating positions, and said mechanism responds immediately to the movement of the manual means for either direction of movement, but delays response to quick operation of the manual means from one operating position to the other operating position; said simulator comprising:

command means operable to either a first or second operating position for generating selectively first and second data respectively corresponding to the desired direction of rod motion;

calculating means to generate data values repetitively at fixed time intervals, said calculating sequence controlling means having the following components means including (a) means responsive to the selected one of the first and second generated data values relating to desired direction of rod motion to generate a third data value relating to rod motion, b. means operative to render the third data value unresponsive to the selected first and second data for a predetermined time subsequent to a change in the first and second operating position of the command means; and indicating means responsive during each said fixed time interval to the generated third data value for indicating values relating to the operation of reactor control rods.

14. An automated simulator according to claim 13 wherein the third data value is generated in response to a change of one of the first and second data values to the other during a predetermined number of said fixed time intervals subsequent to the last generation of the data value related to rod motion.

15. An automated training simulator according to claim 14, wherein the calculating means is structured in a programmed digital computer, and the fixed time interval is each time step of the computer.

16. An automated training simulator according to claim 13, wherein the calculating means is structured in a programmed digital computer, and the fixed time interval is each time step of the computer.

17. An automated training simulator for the real-time operation of a nuclear reactor in which the reactor power output is controlled by movable rods operated by a rod control mechanism to operate the rods in either of two directions a discrete distance during varying time intervals, and wherein the rod control mechanism is activated by a remote manual means while the manual means is operated to either of two operating positions, and wherein each incremental change of distance is indicated remotely; said simulator comprising command means for generating input data corresponding to a desired direction of rod motion;

calculating means to generate data values repetitively at fixed time intervals, said calculating sequence controlling means having the following components means including (a) means to generate during each said time interval data values relating to rod distance and speed in accordance with said input data, b. means governed by data values including rod distance and speed data values to generate during each said time interval a data value relating to fractional time of the said fixed time intervals for each incremental distance of rod travel, c. means to render the data values related to distance and speed unresponsive to said input data during a predetermined time subsequent to a change of input data relating to a change in direction of rod motion, d. means governed by the generated fractional time data values to generate an output signal at time intervals corresponding to each incremental distance of rod travel; and indicating means responsive to each generated output signal to indicate rod motion in accordance with its controlled speed and direction.

18. An automated training simulator according to claim 17 wherein the calculating means is structured in a programmed digital computer, and the fixed time interval is each time step of the computer.

* * * * *